Aug. 20, 1957     W. W. HAEFLIGER     2,803,493
AUTOMOBILE WINDOW SILL COVER
Filed Oct. 4, 1954
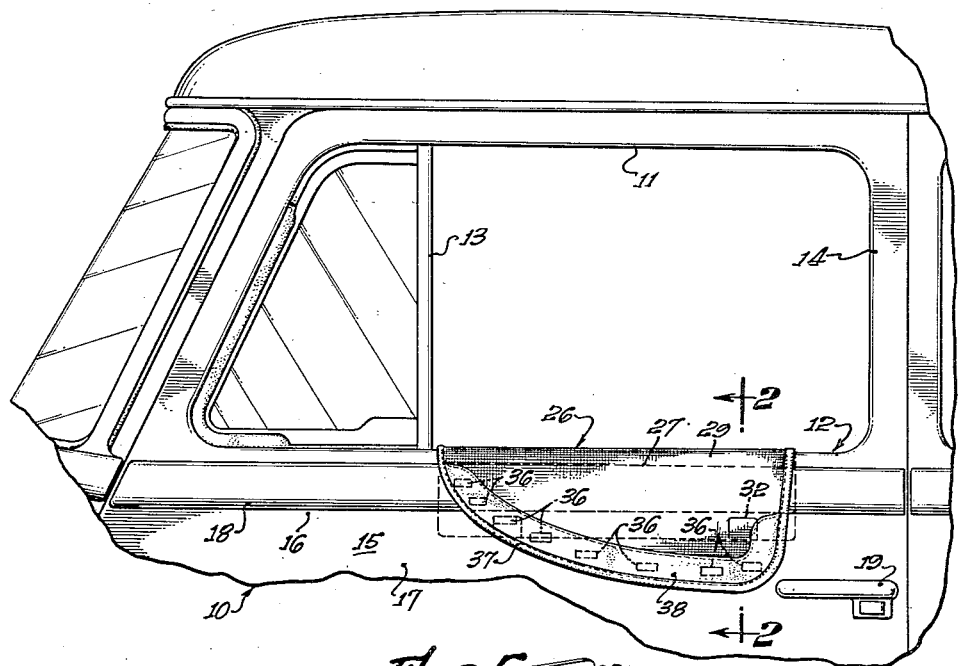
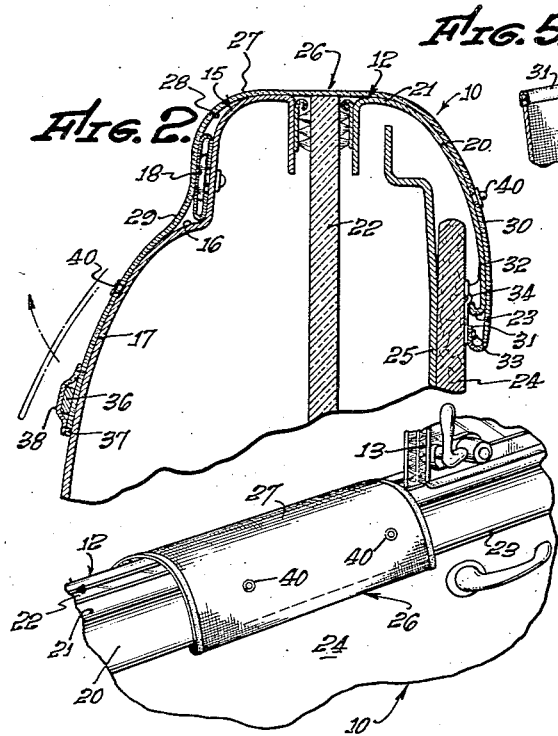
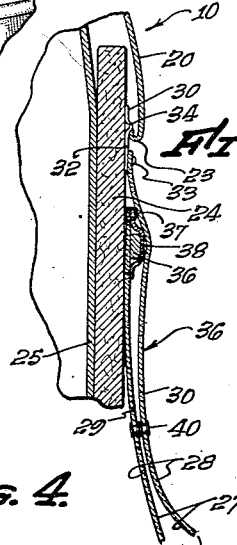
INVENTOR.
William W. Haefliger

United States Patent Office 2,803,493
Patented Aug. 20, 1957

2,803,493

AUTOMOBILE WINDOW SILL COVER

William W. Haefliger, Los Angeles, Calif.

Application October 4, 1954, Serial No. 459,955

3 Claims. (Cl. 296—49.2)

This invention concerns protective covers for automobile window sills, and more particularly has to do with improved cover assemblies, including novel means for holding a cover in extended position over a sill and in retracted position at one side of the sill.

In so far as I am aware, previous attempts to provide protective covers for sills have resulted in the construction of usually stiff covers with supports projecting therefrom for insertion in the window slit at the crest of the sill. Such covers are not altogether satisfactory for many reasons, one being that complete removal of such a cover from a sill is usually necessary whenever raising of the window glass is desired. If complete removal is not required, interference between the glass and the cover or its supports is frequent. Furthermore, such covers are somewhat bulky and present storage problems during non-use. Where departures from stiffened cover construction have been made, problems having to do with flapping of non-rigid cover material in the wind at high vehicle speeds have presented themselves.

The present invention is directed to the provision of a flexible cover adapted to drape over opposite sides of an automobile window sill, there being provided means for securing the flexible cover against flapping in the wind at high speed. My cover embodies means for anchoring one side thereof to the sill in such a way that the cover may be easily and quickly extended over the sill when the window glass is down, and conveniently retracted when desired. Furthermore, the cover is so arranged and constructed to occupy a minimum of space both in the extended and retracted conditions. The latter condition is especially desirable in the form met by the present invention, as the cover is retained beneath the sill and flattened against the side wall of the passenger compartment, in which position it is readily accessible for convenient extension over the sill. Another significant advantage embodied in my protective support resides in its adaptability for use on the majority of modernly manufactured automobiles.

In keeping with these features, I provide a flexible cover assembly comprising a cover made of a material adapted to drape over a window sill and to conform to the shape thereof. The cover is elongated in the direction of the sill, has top and bottom faces, and opposite sides one of which is connected to the inside of the sill molding, and the other of which may be magnetically anchored to the steel exterior surface of the automobile outside and below the sill crest.

I provide one or more retaining clips which are attached to one side edge of the cover and which are sufficiently thin to be insertible between the sill garnish molding and the fabric covered wall of the vehicle door. Since a condition of compression normally is present between the molding and the wall fabric, the retaining clips are conveniently held therebetween so as to anchor the cover in position at the inside of the sill.

For purposes of holding the cover in extended position over the sill, one or more small permanent magnets are carried by the outer half of the cover assembly, and desirably near its forwardly presented edge. Placement of the magnets in this location facilitates magnetic retention of the edge of the cover against the steel surface of the automobile, preventing the formation of wind pockets beneath the edge, which tend to cause flapping of the cover assembly at high vehicle speeds. The force of attraction of the magnets against the steel automobile surface is adequate to prevent flapping of the cover assembly, but is not so great as to prevent ready retraction of the cover to the inside of the passenger compartment whenever desired.

Other objects include the provision of snaps or other similar means on the cover for the purpose of holding it in a folded condition when retracted and flattened against the inside surface of the door or passenger compartment.

These and other objects and advantages of the present invention will be more fully understood by reference to the accompanying drawings wherein:

Figure 1 is a cut-away elevational view of the exterior of the left front door and window of an automobile;

Figure 2 is a sectional view taken on line 2—2 of Fig. 1 showing the cover assembly in extended position;

Figure 3 is a view similar to Fig. 2 showing the cover assembly in retracted or withdrawn position;

Figure 4 is a perspective view of a portion of the interior of the left front door and window sill, illustrating the cover in extended position thereon; and Figure 5 is a perspective view of a portion of the edge of the cover assembly showing a clip carried thereby.

The drawings have reference to conventional door and window structure of an automobile, and merely for purposes of illustration show an automobile door 10 including a window 11 bounded at the bottom by a sill 12, and at the front and rear by vertical strut 13 and upright member 14. Extending downward from the sill at the outer side of the door is a steel panel 15, formed in the manufacturing process to have a recess 16 located beneath the sill, and an outwardly bulged portion 17 extending downward therefrom. To the outer surface of the panel between the sill and the recess may be attached a steel strip 18 which has been plated with chromium for decoration. Positioned below the sill and at the rear of the door is the door handle 19.

In conformance with accepted automotive door design, the inner side of the door is shown to include an extended length of decorative garnish molding 20, commonly of steel manufacture, the upper portion 21 of which forms part of the sill adjacent the retracted window glass 22, and the lower edge 23 of which is inwardly curved toward a layer of door fabric 24. The latter is commonly backed up by another steel panel 25, as shown, and in conformance with practice, a condition of compression exists between the lower curled edge 23 of the garnish molding and the layer 24.

Coming now to a description of the cover assembly for the door sill, the assembly comprises a cover 26 preferably made of a flexible cloth-like or plastic material adapted to drape over opposite sides of the sill when extended. While the shape of the cover may take a large variety of forms, it is shown in the drawings to be elongated in the direction of the sill and to have upper and lower faces 27 and 28, and opposite sides 29 and 30. Attached to inner side 30, preferably at or near its edge 31 and against outer face 27 thereof are one or more retaining clips or tabs 32, which may be formed of thin, flat metal stock, or molded plastic. Merely as illustrative, the clips are shown to be fastened to the cover by rivets 33, with dimples 34 being formed in the clips to hold them in position under the sill molding, as will be brought out.

The opposite or outer side 29 of the flexible cover carries one or more small permanent bar magnets 36, which may for example be comprised of a material such as that known as Alnico, capable of producing a strong magnetic field in relation to the size of the magnet. As shown in the drawings, the magnets are preferably positioned near the edge 37 of outer side 29 of the cover, and are retained in position between the outer face 27 of the cover by a narrow band of fabric 38 overlapping the magnets and stitched to the cover.

To mount the cover assembly in position on the door 10 of the automobile, the clips 32 are forcibly inserted upwardly between the curled edge of the garnish molding and the door fabric layer, so that the dimples on the clips are initially compressed and then snap back as they clear the edge of the molding, as shown in Fig. 3. When in this position, the clips cannot slip downward, and therefore act to anchor the edge 31 of the cover in position adjacent the inner surface of the door directly beneath the sill molding.

Whenever extension of the cover assembly is desired, so as to afford protection against a window sill which has become wet, dirty, or too hot, the outer side of the cover is carried over the sill to bring the magnets into proximity to the outside steel panel 15 of the door. In this position, the magnets adhere strongly to the panel and anchor the outer side of the cover in position, so that the cover is securely positioned over the sill. In order that wind forces may be prevented from causing flapping of the outer side of the cover, the magnets 36 are carried at spaced locations along the forwardly presented edge 37 of the cover, which is subjected to the largest wind forces. Edge 37 may of course be formed in a variety of shapes, but sufficient magnets should be carried thereby to prevent loosening and flapping of the cover. Where the exterior shape of the door is non-uniform, as is illustrated by recess 16 and bulge 17 in the door panel 15 and by chromed strip 18, the magnets should be vertically closely spaced in order that the forward edge of the cover may be caused to adhere to the door to prevent formation of wind-gathering pockets between the cover and the door.

As described in the introduction, the cover assembly may be conveniently removed from the sill by pulling the outer side thereof away from the steel panel 15, as shown in Fig. 2, and thereafter folding it under the inner side 30 in the manner illustrated in Fig. 3. Retention of the folded condition of the cover assembly may be had by the provision of appropriately placed male and female snap members 40 in the inner and outer sides of the cover. When in retracted position, the cover assembly is maintained flattened against the door member 24 to occupy minimum space, and yet positioned for rapid extension over the sill whenever desired.

If the garnish molding is constructed of steel, as is the usual practice, the cover may be held in retracted condition by allowing the magnets to seat against the molding, so that the remainder of the cover hangs downwardly and from the clips under the molding.

I claim:

1. A protective cover assembly for a window sill of an automobile body having molding at the interior side of the sill and a steel surface at the exterior side of the sill, said assembly comprising a flexible cover having opposite sides, a thin tab connected to an edge portion of one of said cover sides and insertible under said molding at the base thereof for anchoring said side of the cover at the interior side of the sill, and magnetic means carried by the other of said cover sides for holding said other side against said steel surface of the automobile exterior of the sill.

2. A protective cover assembly for a window sill of an automobile body having molding at the interior side of the sill and a steel surface at the exterior side of the sill, said assembly comprising a flexible cover having opposite sides, means connected to an edge portion of one of said cover sides and engageable with said molding for anchoring said side of the cover at the interior side of the sill, and magnetic means carried by the other of said cover sides for holding said other side against said steel surface of the automobile exterior of the sill, and a snap carried by said cover for holding said cover in folded condition at the interior of said sill below said molding.

3. The invention as defined in claim 1 in which said other side of the cover includes a forwardly presented edge, and in which said magnetic means comprise permanent magnets carried by said other side of the cover proximate to said edge.

References Cited in the file of this patent

UNITED STATES PATENTS

| | | |
|---|---|---|
| 1,306,199 | Stanwood | June 10, 1919 |
| 1,308,993 | Ridington | July 8, 1919 |
| 1,624,741 | Leppke | Apr. 12, 1927 |
| 2,274,026 | Allen | Feb. 24, 1942 |
| 2,319,292 | Boggs | May 18, 1943 |
| 2,462,768 | Ortleb | Feb. 22, 1949 |
| 2,536,895 | West | Jan. 2, 1951 |
| 2,639,751 | Flaherty | May 26, 1953 |